United States Patent [19]
Lumelsky

[11] Patent Number: 5,430,464
[45] Date of Patent: Jul. 4, 1995

[54] COMPRESSED IMAGE FRAME BUFFER FOR HIGH RESOLUTION FULL COLOR, RASTER DISPLAYS

[75] Inventor: Leon Lumelsky, Stamford, Conn.

[73] Assignee: International Business Machines Corporation, Armonk, N.Y.

[21] Appl. No.: 173,137

[22] Filed: Dec. 22, 1993

Related U.S. Application Data

[63] Continuation of Ser. No. 733,768, Jul. 22, 1991, abandoned.

[51] Int. Cl.[6] ............................................. G09G 1/02
[52] U.S. Cl. ..................................... 345/191; 345/186
[58] Field of Search ................ 340/798, 799, 701, 702, 340/703; 395/131, 114; 345/185, 186, 189, 190, 191, 202; 382/47, 52

[56] References Cited

U.S. PATENT DOCUMENTS

| | | | |
|---|---|---|---|
| 4,410,965 | 10/1983 | Moore | 365/230 |
| 4,492,983 | 1/1985 | Yoshida et al. | 358/260 |
| 4,541,010 | 9/1985 | Alston | 358/44 |
| 4,554,638 | 11/1985 | Iida | 364/521 |
| 4,559,535 | 12/1985 | Watkins et al. | 340/793 |
| 4,564,915 | 1/1986 | Evans et al. | 364/521 |
| 4,580,134 | 4/1986 | Campbell et al. | 340/703 |
| 4,591,842 | 5/1986 | Clarke et al. | 340/723 |
| 4,626,929 | 12/1986 | Ichinoi et al. | 358/310 |
| 4,639,721 | 1/1987 | Eto et al. | 340/703 |
| 4,654,484 | 3/1987 | Reiffel et al. | 379/53 |
| 4,683,555 | 7/1987 | Pinkham | 365/215 |
| 4,684,942 | 8/1987 | Nishi et al. | 340/703 |
| 4,698,788 | 10/1987 | Flannagan et al. | 365/205 |
| 4,764,866 | 8/1988 | Downey | 364/200 |
| 4,768,082 | 8/1988 | Hiratsuka et al. | 358/13 |
| 4,772,956 | 9/1988 | Roche et al. | 358/260 |
| 4,783,841 | 11/1988 | Crayson | 382/56 |
| 4,797,729 | 1/1989 | Tsai | 358/13 |
| 4,808,986 | 2/1989 | Mansfield et al. | 340/747 |
| 4,809,350 | 2/1989 | Shimoni et al. | 382/56 |
| 4,821,119 | 4/1989 | Gharavi | 358/136 |
| 4,847,677 | 7/1989 | Music et al. | 358/13 |
| 4,857,992 | 8/1989 | Richards | 358/13 |
| 4,857,993 | 8/1989 | Music et al. | 358/13 |
| 4,868,764 | 9/1989 | Richards | 364/518 |
| 4,893,114 | 1/1990 | Ishii | 340/703 |

(List continued on next page.)

FOREIGN PATENT DOCUMENTS

| | | |
|---|---|---|
| 0279229A2 | 8/1988 | European Pat. Off. . |
| 0410777A2 | 1/1991 | European Pat. Off. . |
| WO84/02026 | 5/1984 | WIPO . |

OTHER PUBLICATIONS

Healy et al., "Digital Video Bandwidth Compression Using Block Truncation Coding", IEEE Transactions on Comm., vol. COM-29, No. 12, 12/81, pp. 1809–1817.

Arnold et al., "Improvements to the Constant Area Quantization Bandwidth Compression Scheme", IEEE Transactions on Comm., vol. COM-29, No. 12, 12/81, pp. 1818–1823.

Primary Examiner—Richard Hjerpe
Assistant Examiner—Chanh Nguyen
Attorney, Agent, or Firm—Perman & Green

[57] ABSTRACT

An image buffer is described for an X×Y pixel display, which image buffer stores compressed image pixel data for a plurality of n×m matrices of pixels, each matrix represented by a pair of color codes and MASK having nm bit position, each positions mapping to a pixel in the matrix, a manifested bit value in a MASK bit position defining the color code assigned to a mapped pixel. The image buffer includes serial registers for feeding pixel color code values to a buffer serial output and multiplexers for providing n bit values from the MASK on n of its output lines. Gating circuitry, controlled by bit values on the output lines, are operative to gate either a first set of inputs or a second set of inputs into the shift registers. Control circuitry is provided for feeding a pair of color codes and the MASK bit values to the gating circuits and multiplexers, respectively, and for serially operating the serial shift registers in response to the gating of the inputs from the gating circuits.

7 Claims, 4 Drawing Sheets

U.S. PATENT DOCUMENTS

| | | | |
|---|---|---|---|
| 4,897,717 | 1/1990 | Hamilton et al. | 358/133 |
| 4,908,610 | 3/1990 | Yamamuro et al. | 340/703 |
| 4,920,504 | 4/1990 | Sawada et al. | 364/521 |
| 4,941,193 | 7/1990 | Barnsley et al. | 382/56 |
| 4,951,258 | 8/1990 | Uehara | 365/222 |
| 4,965,845 | 10/1990 | Chan et al. | 382/56 |
| 4,970,663 | 11/1990 | Bedell et al. | 364/521 |
| 4,975,771 | 12/1990 | Kassatly | 358/146 |
| 4,980,765 | 12/1990 | Kudo et al. | 358/160 |
| 4,985,871 | 1/1991 | Catlin | 365/230.06 |
| 5,056,041 | 10/1991 | Guttag et al. | 364/518 |
| 5,068,650 | 11/1991 | Fernandez et al. | 340/799 |
| 5,125,048 | 6/1992 | Virtue et al. | 382/27 |
| 5,132,670 | 7/1992 | Miller | 340/799 |
| 5,134,582 | 7/1992 | Ishii | 340/799 |
| 5,138,303 | 8/1992 | Rupel | 340/703 |
| 5,148,523 | 9/1992 | Harlin et al. | 395/164 |
| 5,163,024 | 11/1992 | Heilveil et al. | 365/219 |
| 5,261,049 | 11/1993 | Lumelsky et al. | 395/164 |

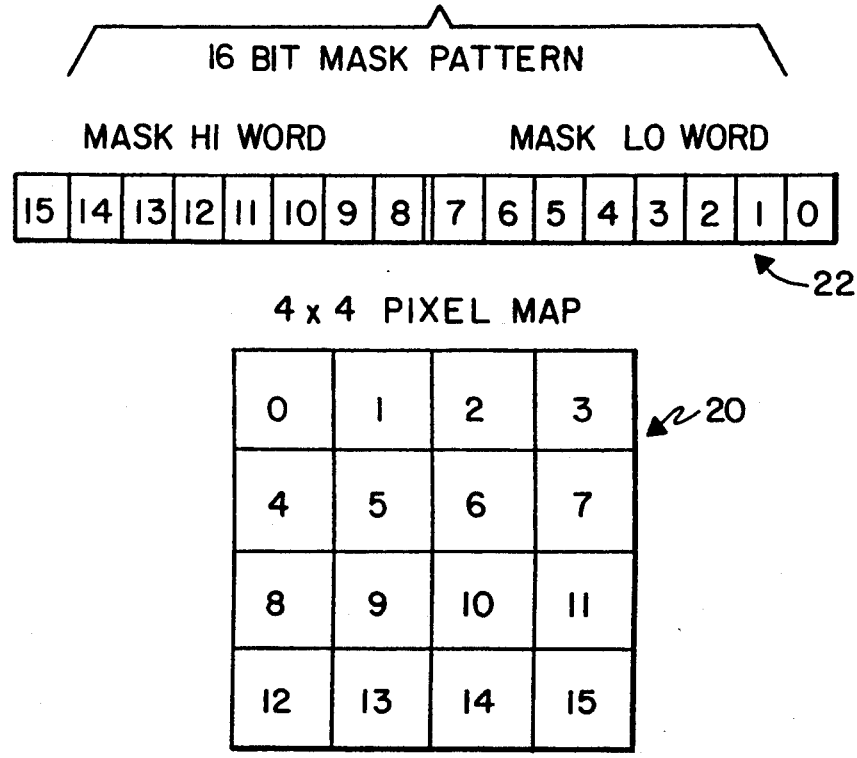

COMPRESSED IMAGE FRAME BUFFER FOR HIGH RESOLUTION FULL COLOR, RASTER DISPLAYS

This is a continuation of application Ser. No. 07/733,768 filed on Jul. 22, 1991, now abandoned.

FIELD OF THE INVENTION

This invention relates to high definition color raster displays and, more particularly, to a frame buffer for storing compressed image data for such a display.

BACKGROUND OF THE INVENTION

Many image processing applications, e.g., medical imaging, scientific visualization, multi-media presentations, etc., require high resolution, real color images to be manipulated and displayed. Professional workstation displays have image resolutions that range from 1K (lines) by 1K (pixels) to 2K by 2K. Pixel colors are represented by three bytes, one byte for each of the red, green and blue color components. In such systems, images are stored in a frame buffer having a capacity of three megabytes (MB) to 12 MB.

A frame buffer should have a video bandwidth approximately equal to the frame resolution (number of pixels), multiplied by the number of frames per second provided to the display system. Usually, the number of frames per second ranges from 30, for interlaced television monitors, to 60 or higher for non-interlaced displays. Thus, a frame buffer with a 1K by 1K resolution should provide 60 million pixels to a non-interlaced monitor input. The video clock (VCLK) which shifts data to the digital-to-analog converter from the memory should be higher than 60 Mhz. In reality, about 20% of a frame time is spent for horizontal and vertical flyback and usually 80 Mhz is an appropriate VCLK frequency.

Using video random access memory (VRAM) chips with serial output port shift frequencies of 30 Mhz, three VRAM chips must work in parallel to provide a necessary video output bandwidth. (Usually, four VRAMs are used as they enable an easier implementation of the frame buffer input/output datapath.) Thus, the higher the resolution, the wider the bandwidth of the memory video path that is required and the greater the number of chips that must be activated in parallel. Furthermore, for high resolution the number of memory chips may, as a result of being operated in parallel, provide a greater amount of memory than that which is required for image storage and result in wasted memory space. Full motion images require double the memory for storage in order to eliminate the image tearing artifact. The so-called dual buffer approach allows one frame of storage to be updated while showing a previous frame. When a new frame is fully stored, half of the buffer storing the new frame is switched to digital-to-analog converters at the video output during the next vertical synch signal. Then, an update of the second half of the buffer starts with a next frame of data.

The requirements of spatial and color resolution, video bandwidth and double buffering may be satisfied only when using large frame buffers with a large number of expensive memory chips. One way to reduce the amount of memory is to compress an image according to standard compression methods. This enables the image to be stored in a smaller frame buffer and to be decompressed while reading the image from the frame buffer to the video channel. Major problems are presented by such storage techniques. First, contemporary approaches to image compression do not sufficiently preserve high frequency components that accompany graphic data or text. Second, commonly used comparison algorithms are too complex to enable decompression chips using such algorithms to exhibit a necessary high resolution video output bandwidth. Third, a majority of those algorithms require non-uniform image update access and leads to further decreases of video output bandwidth. Thus, while the amount of memory is reduced through the use of such compression/decompression techniques, it is difficult to apply such video buffers to high performance displays.

In FIG. 1, a conventional frame buffer architecture is illustrated and is shown providing a 1K by 1K resolution with 24 color bits per pixel. It includes four memory blocks, M0, M1, M2 and M3, a serializer 10, an oscillator 12, counter 14 and decoder 16. Each memory block M0-M3 includes several VRAM chips and has an internal address structure of 512 rows by 512 columns. Each individual row/column position holds twenty-four bits. Memory modules M0-M3 provide four (24 bit) adjacent pixels, in parallel, to serializer 10. Oscillator 12 generates a VCLK signal which serves as a clock frequency for four 24 bit registers, R0, R1, R2, and R3 within serializer 10. Clock signal VCLK is divided by a counter 14 to provide a serial clock signal (SCLK) with a frequency that is four times lower than VCLK. The SCLK signal shifts out the data from memory modules M0-M3. In specific, SCLK shifts data out of the VRAMS within modules M0-M3 from their secondary serial ports.

A decoder 16 generates a short pulse LD at each falling edge of SCLK (each pulse LD has a length of one VCLK). Pulse LD loads 96 bits from the VRAM secondary (serial) ports into the bit positions within serializer 10. The LD signal also controls a plurality of multiplexers M1-M3. In the absence of an active LD signal, the multiplexers are switched to a state to enable one register stage to pass its signal to a next stage. Thus, during a subsequent 3 VCLK periods, multiplexers M1-M3 connect registers R0-R3 into a shift register. As a result, four pixels are loaded into the serializer in parallel and shifted out sequentially as 24 bit color data to red, green, and blue digital-to-analog converters (not shown).

As can be seen from an examination of the buffer system shown in FIG. 1, in order to configure a 2K by 2K dual buffer without compression would require the use of 64-four megabyte chips. As will be seen hereinafter, compression/decompression enables substantial reduction in the amount of memory required for a 2K by 2K dual buffer (e.g., by a factor of 8).

A favored compression algorithm is a block truncation method that is described in detail by Healy et al., in "Digital Video Bandwidth Compression Using Truncation Coding", IEEE Transactions COMM, COM-9, Dec. 1981, pages 1809–1823. That compression algorithm provides high quality text and graphic image decompression and reasonable quality, television-like natural images. The compression method, per se, is not directly relevant to this invention and only certain aspects of it will be reviewed.

The basic idea of the algorithm is to represent each 4 by 4 region of pixels (48 bytes, assuming three bytes per pixel) with two colors, (three bytes each) plus a 16 bit wide MASK. The two colors are calculated statistically to best represent the distribution of colors in the 4 by 4 pixel region. The two colors are called Hi color and Lo color. Each MASK bit determines whether the corresponding pixel should get either a Hi or Lo color When the MASK bit value is a "1" then the corresponding pixel gets the Hi color; and when the MASK bit value is a "0" then the corresponding pixel gets the Lo color. This is illustrated in FIG. 2 which shows the bit mapping of a 4 by 4 pixel region 20 to its MASK 22.

The decompression mechanism is simpler than that of compression. For each 4 by 4 pixel matrix, a destination device receives two colors (Hi and Lo) and the 16 bit MASK. For each bit of the MASK, the corresponding pixel in the 4 by 4 pixel matrix gets either the Hi color, if the MASK bit is a 1 or the Lo color, if the MASK bit is a 0. FIG. 3 shows the compressed data format of an arbitrary 4 by 4 pixel area 24 where each pixel is either one of the colors, A or B.

The above-noted compression scheme has been employed in the prior art. In Campbell et al. U.S. Pat. No. 4,580,134, a color video display is described wherein a buffer memory uses two colors per pixel data matrix in the decoding action. Here, however, the bit MASK is employed to access color addresses which, in turn, access video look-up tables to find the actual color codes. For high performance systems, such video look-up tables do not provide adequate speed characteristics to enable the video bandwidth to be achieved at a reasonable cost.

In Tsai U.S. Pat. No. 4,797,729 a truncation coding system is described which evidences a tolerance to channel errors. Decompression occurs on the input to the buffer and full color pixel matrices are stored. A similar decompression arrangement is shown in Yamamuro et al. U.S. Pat. No. 4,908,610.

Other compression systems may be found in Music et al. U.S. Pat. No. 4,816,901 (employs differences in luminance functions between pixels to enable more compact encoding of run lengths of pixel data); Fedak et al. U.S. Pat. No. 4,555,802 (encodes image data by ignoring background data and transmits non-zero segments before background data, with offset and length numbers); and Chan et al. U.S. Pat. No. 4,729,127 (describes a mapping technique wherein delta code values enable access to stored, compacted map data).

Accordingly, it is an object of this invention to provide an improved image frame buffer that stores compressed image data for a high resolution, full color raster display.

It is another object of this invention to provide an improved compressed image frame buffer which exhibits a high efficiency in the decompression of the compressed image code.

It is still another object of this invention to provide an improved compressed image frame buffer which is able to provide video output consistent with the requirements of a high resolution full color raster display.

SUMMARY OF THE INVENTION

An image buffer is described for an X×Y pixel display, which image buffer stores compressed image pixel data for a plurality of n×m matrices of pixels, each matrix represented by a pair of color codes and MASK having nm bit position, each positions mapping to a pixel in the matrix, a manifested bit value in a MASK bit position defining the color code assigned to a mapped pixel. The image buffer includes serial registers for feeding pixel color code values to a buffer serial output and multiplexers for providing n bit values from the MASK on n of its output lines. Gating circuitry, controlled by bit values on the output lines, are operative to gate either a first set of inputs or a second set of inputs into the shift registers. Control circuitry is provided for feeding a pair of color codes and the MASK bit values to the gating circuits and multiplexers, respectively, and for serially operating the serial shift registers in response to the gating of the inputs from the gating circuits.

DESCRIPTION OF THE DRAWINGS

FIG. 2 is a schematic showing how a 16 bit MASK maps onto a 4 by 4 pixel array.

FIG. 3 illustrates two 32 bit color words, each containing a portion of a bit MASK and a three byte color code, in combination with a 4 by 4 pixel array showing how the colors are mapped therein in accordance with received color codes and MASK bits respectively.

DETAILED DESCRIPTION OF THE INVENTION

Figure 4:
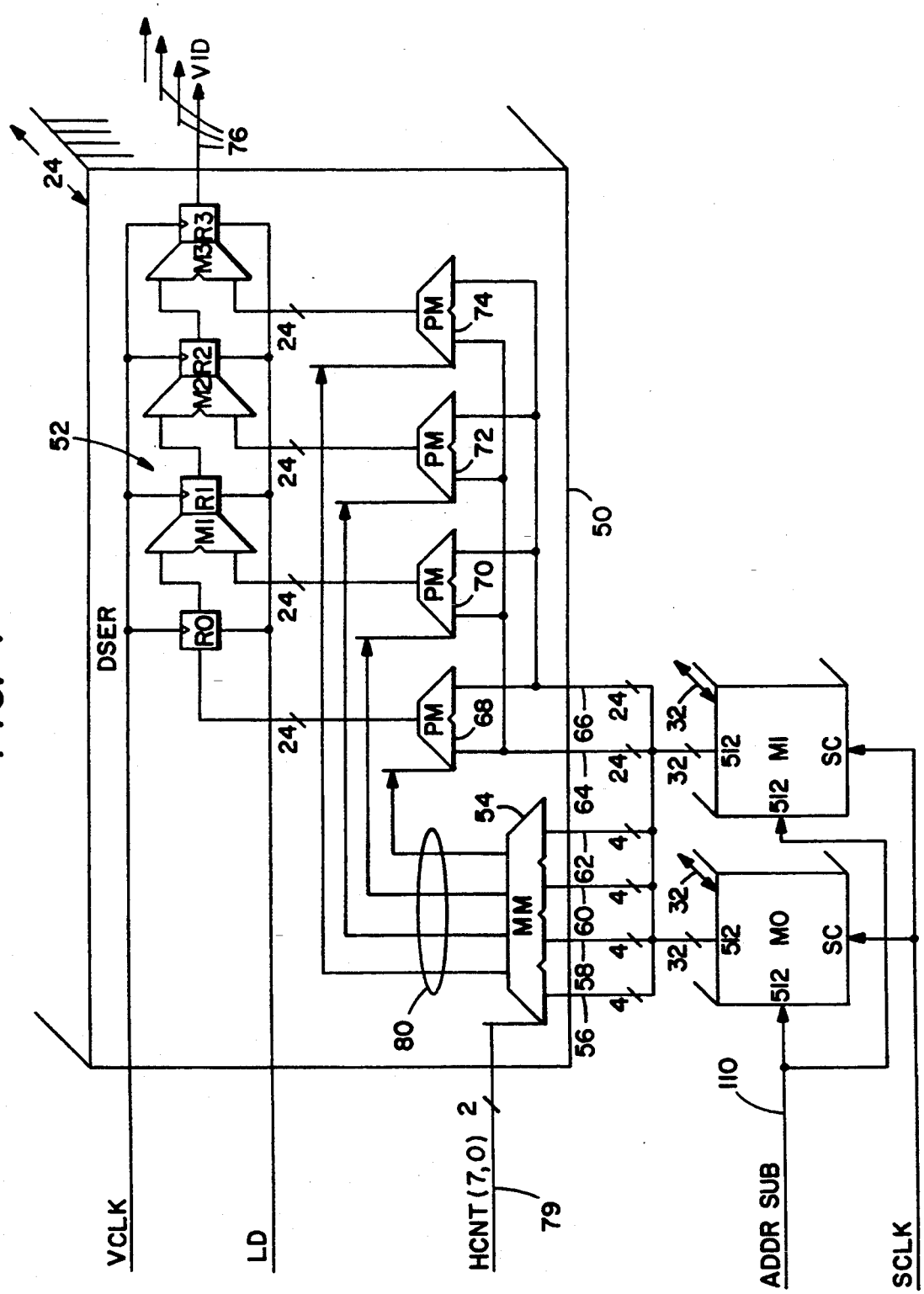
FIG. 4 is a block diagram of a frame buffer incorporating the invention hereof.

Referring now to FIG. 4, a frame buffer includes a pair of memory blocks M0 and M1. Each memory block is 512 by 512 words, each 32 bits wide and is adapted to store a a portion of a 1K by 1K pixel display. Each word contains a three byte color code and an 8 bit portion of a MASK. Two succeeding 32 bit words contains sufficient information to allocate two colors over a 4 by 4 pixel array in accordance with the bit values exhibited in the MASK portions of the data words.

Figure 1:
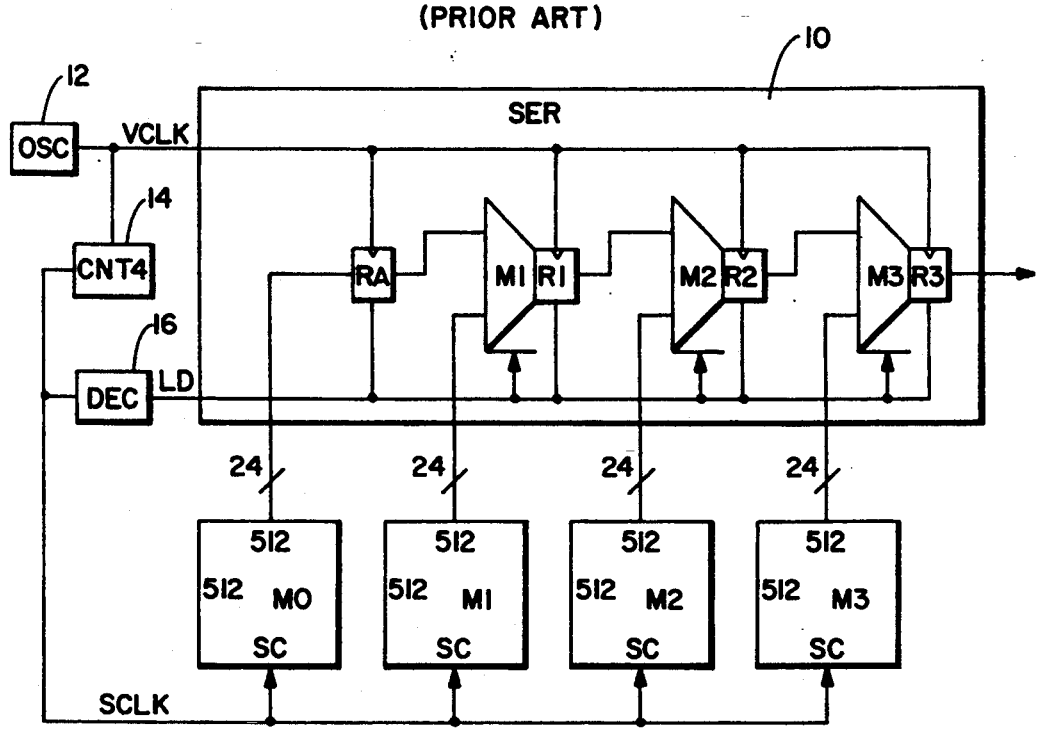
FIG. 1 is a block diagram of a prior art frame buffer arrangement.

A 32 bit data bus emanates from each of modules M0 and M1 and supplies a pair of 32 bit words to a decompressor/serializer (DSER) 50. DSER 50 includes serializer hardware 52 that is similar in structure to that shown in SER 10 in FIG. 1. DSER 50 also includes decompression hardware including a MASK multiplexer (MM) 54. Each time a pair of compressed data words are fed from modules M0 and M1, a 16 bit MASK is manifest on 4-bit buses 56, 58, 60 and 62 and is then multiplexed by multiplexer MM54 to a 4 bit output on bus 80. In a similar manner, color A and color B codes (3 bytes each) are fed via buses 64 and 66, respectively, to a series of four pixel multiplexers (PM) 68, 70, 72 and 74. Each of hardware elements MM 54 and PM 68, 70, 72, and 74 and serializer 52 is repeated 24 times so as to enable each of the individual 24 bits in the respective color codes to be decompressed and provided as outputs on output lines 76 from DSER 50.

Figure 5:
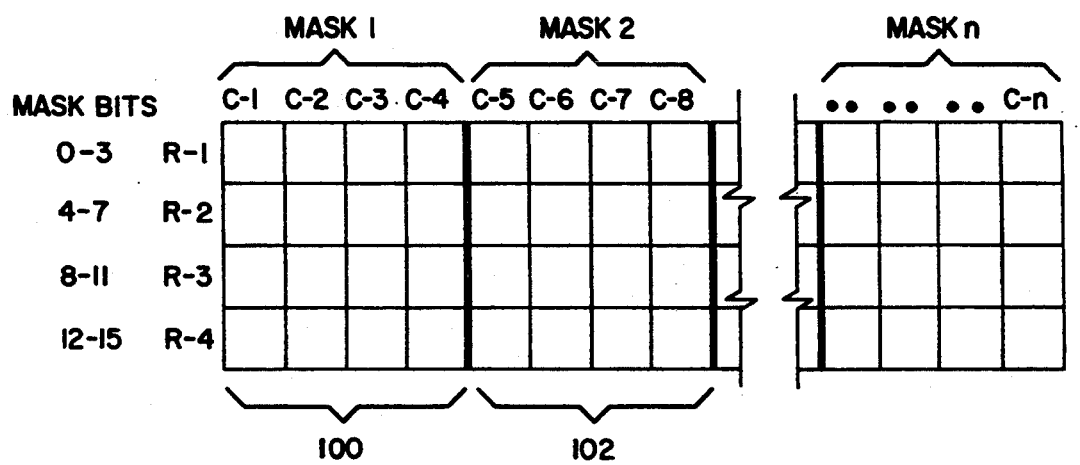
FIG. 5 is a schematic diagram illustrating a plurality of 4 by 4 pixel arrays and showing how the MASK bits are employed to selectively access rows of the pixel arrays.

Referring to FIG. 5, the inter-relationship of the MASK bits, pixel rows, pixel matrices and MASKs are illustrated. As is well known, the pixels are arranged in rows and columns with rows R1–R4 and columns C1–CN being illustrated. As stated above, each 4 by 4 matrix of pixels 100, 102, etc. is represented by two color codes and a MASK. MASK 1 indicates where color codes A and B are to be placed within the pixels that fall within rows R1–R4 and columns C1–C4.

MASK 2 performs a similar function for pixel matrix 102, etc. MASK bits 0–3 map the A and B color values into the four pixels in row R1 whereas MASK bits 4–7 function similarly for row R2. The remaining relationships are shown in FIG. 5.

The frame buffer of FIG. 4 functions by first accessing MASK bits 0–3 of MASK 1 and using those bits to gate the proper color code values into the first row of a pixel matrix (e.g., row R1 of pixel matrix 100). Then, a next set of MASK bits are loaded and, again, MASK bits 0–3 from the new MASK are employed to load the color code values into row R1 of the next pixel matrix 102. This action continues until MASK n has been accessed and the top row of four pixels color code values have been loaded, at which time, MASK 1 is again accessed and MASK bits 4–7 employed to load the color code values into row R2. The system continues in this manner until all four rows of pixel color code values have been loaded into pixel matrices 100, 102, etc., at which point, the next set of pixel matrices are handled in exactly the same manner.

Returning now to FIG. 4, the selection of the particular MASK bits to be manifest on the output from MM 54 is controlled by values of a horizontal line counter (HCNT) output on bus 79 where two of its low order positions (1,0) are manifest. Thus, for a video line number with the two least significant bits equal to 00, only low order bits 0–3 of the MASK are manifest on output lines 80 from MM54. This four bit partial MASK gates color code values from PMs 68–74 in accordance with the MASK bit values (it being remembered that both color codes are applied to each of PMs 68, 70, 72 and 74. After the 24 bit color values are gated to serializer 52, they are serially provided to outputs 76 by the clocking action of the VCLK input. Thus, during one SCLK cycle, four pixels are loaded into registers R0–R3 and shifted out at the VCLK frequency. During a next serial clock, the next 16 bit MASK and a pair of 24 bit colors again appear on input buses 56, 58, 60, 62, 64 and 66 respectively. Again, only the low four order bits of the MASK are used and provide the next four 24 bit pixels at the outputs 76.

The two memory modules M0 and M1 illustrated in FIG. 4 each hold 512 by 512 by 32 bit positions. The module can be comprised of two 4 Mbit VRAMs with an internal organization of 512 by 512 by 16 bits, or eight, 1 Mbit VRAMs with an internal organization of 512 by 512 by 4 bits. An address bus 110 supplies time-multiplexed 18 bit addresses, where 9 bits represent a row address RA, and 9 bits represent a column address CA.

The LD pulse is generated during each fourth VCLK period. It causes two 32-bit words to be read, in parallel, to DSER 50 where they are decompressed into four, 24-bit, sequential pixels. One 32 bit word is read from module M0 and one 32 bit word is read from module M1. As a result, a particular row address represents a line of video comprising 2048 pixels, twice the number of words stored in both modules. A video refresh address is generated by a horizontal line counter HCNT (not shown), and an ODD/EVEN frame signal. The HCNT count is reset by a vertical sync, coming from a display sync generator, and counts horizontal sync pulses, (also coming from a display sync generator) starting from the first visible scan line. the ODD/EVEN signal is the result of dividing a vertical sync by two. This signal controls, whether an odd or even video frame is being refreshed to the screen. Accordingly, updating the frame buffer from a host processor is controlled by the ODD/EVEN signal, which specifies what half of the frame buffer is available for updating.

During video refresh, RA and CA addresses are presented on frame buffer address bus 110. The most significant bit RA(8) repeats the ODD/EVEN signal and bits RA (7..0) are equal to the upper bits of the HCNT (9..2). The column address CA is zero for this implementation.

Each 4 video lines, RA is incremented by 1. In other words, a scan line RA is constant for each four consecutive video lines. During one frame (e.g. when ODD/EVEN signal is high), 256 RA addresses allow the reading of 512, 64 bit words, where each 512 group represents one line of video. During the next frame (when the ODD/EVEN signal is low), another 1024 lines are read, providing dual buffer refresh capability.

Thus, each 64 bit word contains two 24 bit colors, and 16 bit MASK. The colors are reused four times for a group of four by four pixels located on four consecutive video lines. The MASK is used in the following manner: Bits 0–3 of a MASK word serve the upper four pixels, bits 4–7 serve next four pixels, etc. This mechanism is implemented by supplying two least significant bits of the HCNT (1,0) to MM MASK multiplexer 54. The HCNT is incremented each line, thus a new pair of control bits are derived from HCNT (1,0). Those control bits are changed from 00 to 01, 10, 11 and again to 00. Therefore, bits 0–3 of a MASK portion of all 64 bit words stored at a particular row address, are sent to PM multiplexers 68, 70, 72 and 74 during a first line video refresh. With the next line, control bits 01 will allow MASK bits 4–7 to be sent to the PM multiplexers, etc., until all four lines are video refreshed, and the row address of the frame buffer is incremented. Then a next four video lines will be video refreshed in the same manner. The cycle is repeated until all 2048 video lines stored in the memory modules M0 and M1 are video refreshed.

Just from the point of view of storage, only one memory block (e.g., M0) with 512 by 512 by 32 bits could be used. The problem is that one memory block does not provide the necessary output bandwidth for a high performance video display system. As was indicated above, an 80 Mhz VCLK signal is generally used for a 1K by 1K by 60 Hz image display. A serial clock of approximately 25 Mhz allows the display of four images because it provides an effective 100 Mhz bandwidth (four pixels of color value per clock signal). Moreover, for proposed standards which exhibit approximately 960 visible lines, the architecture shown in FIG. 4 allows storage of two frames of high definition television image. It further provides a dual buffer approach to store high definition TV images, thus eliminating motion artifacts.

Figure 6:
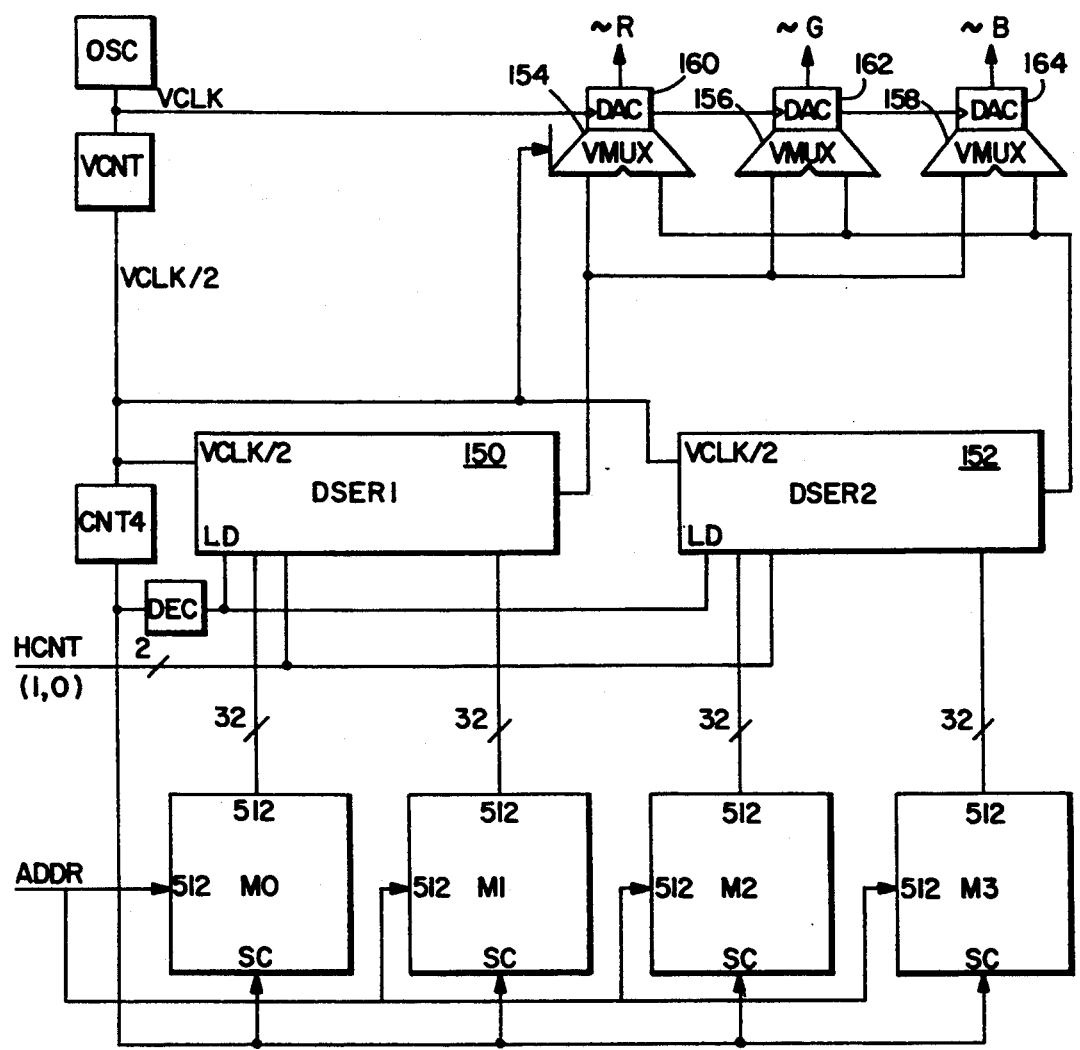
FIG. 6 is a block diagram of a 2K by 2K frame buffer that employs the invention hereof.

Turning to FIG. 6, the application of the architecture shown in FIG. 4 to a 2K by 2K dual buffer image system is shown. It includes four memory blocks M0–M3, two deserializer modules 150 and 152, identical to that shown in FIG. 4 at 50.

Oscillator 154 provides the clock frequency VCLK which is fed to a counter VCNT that divides the VCLK frequency in half. The VCLK/2 output is used as a clock for DSER modules 150 and 152. DSER module 150 generates the first four pixels and DSER module 152 generates the next four pixels, both at a frequency of VCLK/2. The pairs of consecutive pixel groups are further multiplexed by multiplexer 154, 156 and 158 which are also controlled by the VCLK/2 clock frequency. Output values from multiplexers 154, 156 and 158 are fed into digital-to-analog converters 160, 162 and 164 where the digital values are converted to analog values using the VCLK frequency. In other words, digital-to-analog converters 160, 162 and 164 serialize the outputs of DSER modules 150 and 152 while DSER modules 150 and 152 serialize the frame buffer outputs. The clock frequency used for the serializers within DSER modules 150 and 152 is generated by CNT 4 whose output is eight times slower than the VCLK signal.

In operation, four 32 bit words are loaded into DSER modules 150 and 152, representing eight adjacent pixels in the horizontal row direction. Each row address stores two lines with 2K pixels in each and is video refreshed four times. The HCNT (1,0) bits still control what portions of the MASK data control the DSER modules for a particular line. As a result, 8K of video lines are stored in the frame buffer, providing dual 2K by 2K buffers with a video bandwidth equal to 8 times the serial clock frequency. If each memory module is constructed using two-4 megabit VRAM chips, the buffer uses only 8 chips. Using a conventional approach, the same buffer would take 64 four megabit chips.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

I claim:

1. An image buffer for storing compressed image pixel data for a plurality of n by m matrices of pixels, where n and m correspond to a row of pixels and a column of pixels, respectively, and are both positive integers, and where individual ones of said plurality of n by m matrices of pixels form a portion of an l by k pixel image, where l is greater than n and where k is greater than m, each matrix of pixels being represented by a pair of color codes and a MASK having n times m bit positions, each MASK bit position mapping to a single pixel in said n by m matrix, a manifested bit value in a MASK bit position defining the color code of the pair of color codes assigned to said mapped pixel, said image buffer comprising:

storage means for storing a compressed color image corresponding to said l by k pixel image, said storage means having a plurality of addressable memory storage locations each of which stores, for each of said n by m matrices of pixels, a first predetermined color code, a second predetermined color code, and an associated MASK having n times m bit positions, each individual one of said plurality of addressable memory storage locations storing one pair of said predetermined color codes and said associated MASK;

serial shift register means having a serial output port and being responsive to an application of a shift clock for feeding pixel color code values to a serial output of said image buffer, said serial output of said image buffer being coupled to an input of a display means capable of displaying a plurality of lines each comprised of a plurality of pixels, said serial shift register means having a multi-bit parallel input;

multiplex means, having an n times m bit input coupled to an output of said memory storage means for receiving n sub-sets of m MASK bit values therefrom, said multiplex means having a control input that is responsive to an output of a pixel scan line counter for selecting one of said n sub-sets of m MASK bit values and for outputting a selected sub-set on m output lines;

a plurality of m gating means each having a first input and a second input coupled to an output of said memory storage means for receiving a first color code and a second color code from a same addressable storage location that outputs said n times m bit MASK, individual ones of said m gating means being controlled by a value appearing on an individual one of said m output lines of said multiplex means to gate either said first color code or said second color code to said multi-bit parallel input of said shift register means; and control means for controlling the outputting of said first and second color codes from said memory storage means to said gating means inputs and said associated MASK bit values to said multiplex means and for providing said shift clock to said serial shift register means after either said first color code or said second color code are gated by said MASK bit values appearing on said m output lines of said multiplex means.

2. The image buffer as recited in claim 1, wherein said control means, upon operation of said serial shift register means, controls said memory storage means to output a next pair of color codes to said gating means and a next set of MASK bit values to said multiplex means.

3. The image buffer of claim 2, wherein n and m are each equal to four, and wherein said matrix of pixel comprises four columns of pixels by four rows of pixels.

4. The image buffer as recited in claim 1 wherein said multiplex means is responsive to said output of said pixel scan line counter to select a first sub-set of m bit values of said n times m bit MASK during a scan of pixels in a first row and selects a next sub-set of m bit values of said n times m bit MASK during a scan of an immediate next row of said pixels, said next sub-set of m bit values being selected at a time such that said color codes mapped thereby are in column registration with said color code pixel values provided in response to said first sub-set of m bit values of said n times m bit MASK.

5. The image buffer as recited in claim 1, wherein said control means, during a single pixel scan line, successively causes said multiplex means to provide bit values from identical an one of said sub-sets of n bit MASK values from each of a plurality of MASKs as associated pairs of color code values are provided for subsequent n by m pixel matrices, and wherein said control means, on succeeding rows of each n by m pixel matrix, provides succeeding ones of said sub-sets of n bit MASK values from each of said plurality of MASKs for each n by m pixel matrix so as to gate associated color code values into said serial shift register means.

6. An image buffer for storing compressed image pixel data for 4 by 4 matrices of pixels, each matrix of pixels being represented by a pair of color codes and a 16 bit MASK, whose bits map color codes to pixel positions in said matrix, said image buffer comprising:

first and second memory module means for storing a compressed color image, said first and second memory module means having a plurality of addressable storage locations for storing, for each of said 4 by 4 matrices of pixels, a pair of predetermined color codes and an associated 16 bit MASK;

first and second decompressor/serializer means connected to said first and second memory module means respectively, each said decompressor/serializer means including a MASK multiplexer manifesting a subset of MASK bits to control inputs of a set of four color code multiplexers, a manifested subset of MASK bits being selected in accordance with a subset of bits that represent a current pixel scan line number, each of said set of four color code multiplexers having a pair of color code value inputs, said connected memory module means providing, for a pixel matrix, a color code value pair to said color code inputs of said set of four color code multiplexers and a MASK to said MASK multiplexer;

control means for causing said first and said second memory module means to load MASKs and color code value pairs for a pair of adjacent pixel matrices into said respectively connected decompressor/serializer means, said control means further operating each of said decompressor/serializer means in accordance with a subset of MASK bits of said loaded MASK to jointly provide, as outputs, mapped color code values for a contiguous row of 8 adjacent pixels.

7. The image buffer as recited in claim 6 wherein said control means, for a first pixel scan line, selects 4 bit sets of each said MASK, and continues, for succeeding pixel scan lines, to select additional 4 bit sets of each said MASK until all 4 rows of pixels for both of said adjacent 4×4 pixel matrices have had color code values mapped thereunto, after which new pixel matrices, color code value pairs and associated MASKS are handled identically until all pixels in a display have been processed.

* * * * *